April 25, 1961
R. C. BINNING
2,981,680
SEPARATION OF MIXTURES
Filed March 28, 1957
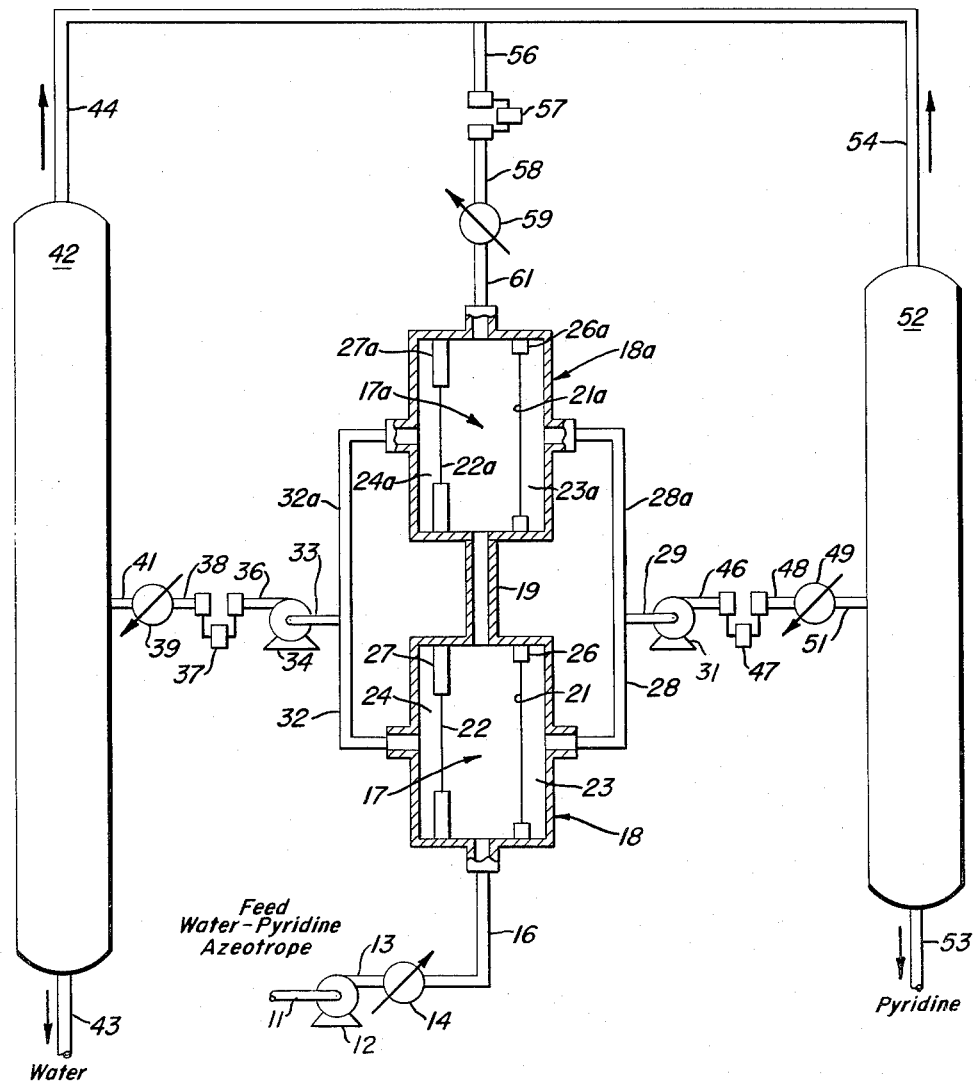
INVENTOR.
Robert C. Binning
BY Joseph C. Kotarski
ATTORNEY United States Patent Office 2,981,680
Patented Apr. 25, 1961

2,981,680

SEPARATION OF MIXTURES

Robert C. Binning, Texas City, Tex., assignor, by mesne assignments, to Standard Oil Company, Chicago, Ill., a corporation of Indiana Filed Mar. 28, 1957, Ser. No. 649,142

5 Claims. (Cl. 210—23)

This invention relates to the separation of mixtures of different molecules and it particularly concerns an improved permeation process for effecting the separation.

It has been proposed heretofore to separate mixtures of two or more different molecules, e.g. mixtures of petroleum hydrocarbons, azeotropic mixtures, etc. which exist in molecular solution by introducing the mixture into the feed zone of a permeation apparatus wherein a portion of the mixture in the feed zone is permeated through a plastic membrane, the permeated and the non-permeated portions thereafter being separately withdrawn from the permeation apparatus. In this type of operation shown by the prior art, an elongated permeation membrane is positioned within an elongated enclosed vessel so as to separate an elongated feed zone from an elongated permeate zone. In this manner only one permeation membrane is employed per permeation stage. The charge mixture to be separated is introduced through one end of the enclosed vessel into the feed zone and passes along the length of the permeation membrane. A portion of the mixture in the feed zone permeates through the membrane and into the permeate zone. The portion in the feed zone which does not permeate through the membrane is removed from the end of the feed zone which is opposite that end where the charge mixture was introduced. Because the plastic permeation membrane allows all components of the mixture to permeate through the membrane but permits one of the components to permeate more rapidly than the other components of the mixture, it is apparent that the composition of the mixture in the feed zone becomes more and more depleted in that component of the mixture which permeates the membrane more rapidly, as the mixture in the feed zone progresses and passes along the length of the membrane surface toward the exit end through which the non-permeated portion is removed from the feed zone. At the place at which the charge mixture first comes in contact with the permeation membrane (immediately adjacent the introduction of the charge mixture into the feed zone), the portion which permeates through the membrane, i.e. the permeate, contains the highest concentration of the more rapidly permeable component. As the mixture in the feed zone passes along the length of the membrane surface and becomes increasingly depleted in this more rapidly permeable component, the permeated portions more remote from the point of charge introduction contain lower concentrations of the more rapidly permeatable component. While it would be advantageous to provide separate withdrawal means for subsequent incremental permeated portions along the axis or length of flow of the mixture through the feed zone and thereby avoid mixing the permeated portions with each other to reach a mean composition, the construction difficulties and costs render this alternative impractical. The additional processing equipment necessary for this multitude of permeated portions of differing composition would make the economics of such a technique prohibitive.

The consequence or net practical effect of the prior art permeation processes, in which the mixture in the feed zone and the composition of the permeated portion continuously change along the axis of flow, is to cause a reduction in the selectivity of the permeation membrane and require additional permeation stages to produce permeate having the same composition as that obtained from the initial or charge mixture.

An object of the present invention is to provide a permeation process in which the mixture throughout the feed zone does not fluctuate in composition and has substantially the same composition as the charge mixture introduced. Another object is to provide a permeation process which avoids or substantially eliminates the customary monitoring, changing of operation, and lining out, in the startup procedure. A further object is to provide a continuous permeation process which is operated in a simplified fashion with a minimized amount of control equipment. A still further object is to provide a permeation process which provides a greater separation efficiency. An additional object is to provide an improved method of separating azeotropic mixtures in a highly efficient manner.

This invention is based on the principle of using two or more dissimilar (having different compositions) permeation membranes, each of which dissimilar membranes are perferentially selective for permeating different components of the charge mixture. In accordance with the invention, the dissimilar permeation membranes separate the feed zone from separate and non-communicating permeate zones. The number of dissimilar permeation membrane compositions is at least two and is preferably the same as the number of components contained in the mixture to be separated and the same as the number of permeate zones. The effective (i.e., utilized) surface area of the dissimilar permeation membrane compositions are employed in ratios with respect to each other such that the composition of the mixture of molecules in the feed zone is the same as the composition of the charge introduced to the feed zone. A wide variety of mixtures of different molecules containing two or more components can thus be partially or completely separated, using various permeation membranes. In this manner, mixtures of different molecules existing in the form of molecular solutions, as distinct from suspensions or colloidal solutions, may be resolved.

An embodiment of the invention is highly useful in separating azeotropic mixtures in a continuous manner. For example, an azeotropic mixture of components A and B can be resolved to recover the individual components A and B in essentially pure form by introducing the azeotropic mixture into the feed zone of the permeation apparatus which contains two non-communicating permeate zones $A_1$ and $B_1$ which are separated from the feed zone by two dissimilar permeation membranes $A_2$ and $B_2$. Permeation membrane $A_2$ permits the permeation into permeate zone $A_1$ of component A in preference to component B, but does not prevent permeation of the latter component. Permeation membrane $B_2$ permits the permeation into permeate zone $B_1$ of component B in preference to component A, but does not prevent permeation of the latter component. The permeated portions are separately withdrawn from permeate zones $A_1$ and $B_1$ and sent to separate fractionators $A_3$ and $B_3$ respectively. In the fractionators, the permeated portions are fractionated to produce two fractions. One of the fractions consists of a component of the azeotropic mixture in essentially pure form, and the other fraction consists of a mixture of components A and B. The separate fractions of essentially pure components are withdrawn from the fractionators, and the fractions consisting of mixtures of components A and B are recombined and recycled to the feed zone of the permeation apparatus. The recombined portion has a composition which approximates the composition of the azeotropic mixture. Continuous operation of the permeation unit and the fractionators in the manner outlined above maintains the composition of the mixture in the feed zone of the permeation apparatus at approximately the composition of the azeotropic mixture and thereby secures the advantages of the present invention.

The present invention, and certain of its objects and advantages, will be apparent from the detailed description of an embodiment of the invention which is shown in the attached single figure which forms a portion of this specification. The figure displays in schematic form, and in partial cross section, an embodiment of the present invention for separating an azeotropic mixture of pyridine and water.

Referring to the figure, the azeotropic mixture consists of 43 weight percent pyridine and 57 weight percent water. It is introduced at the rate of 8,500 lbs./hr. into line 11, pumped by means of pump 12 wherein it is pressured to approximately 100 p.s.i.g. The azeotropic mixture is passed from pump 12 by way of line 13 into heater 14 wherein its temperature is raised to about 140° C. Thereafter the azeotropic mitxure is passed in the liquid phase by way of line 16 into the feed zone 17 of the permeation apparatus 18. As shown in the figure, two permeation apparatus operating in parallel are employed. The feed zone of permeation apparatus 18 is connected by means of line 19 with the feed zone 17a of permeation apparatus 18a. The portions of the upper permeation apparatus which are identical with the lower permeation apparatus will be designated herein by applying the suffix "a" to the designating numeral. A number of additional permeation apparatus may also be connected in the parallel manner described to provide the desired total membrane surface area. Permeation apparatus 18 is of rectangular structure and contains permeation membranes 21 and 22 which separate the feed zone 17 from permeate zones 23 and 24, respectively. The permeation membranes 21 and 22 are mounted within the permeation apparatus by mounting means 26 and 27, respectively. The components of the azeotropic mixture cannot pass into permeate zones 23 and 24 except by permeation through permeation membranes 21 and 22, respectively.

Permeation membrane 21 is comprised of irradiated polyethylene (Irrathene-201) of 0.5 mil thickness. The total effective (i.e. the surface area which is utilized for permeation) surface area of permeation membranes 21, 21a, etc. is 1,500 square feet. Permeation membrane 22 is comprised of regenerated cellulose (type 300 PT) of 0.5 mil thickness. The total effective surface area of permeation membranes 22, 22a, etc. is 950 square feet. The ratio of the surface area of membrane 21 to membrane 22 is 1.6; similarly the ratio of the area of 21a to 22a is 1.6.

Permeate zones 23 and 24 are separated from each other and do not communicate, for to admix the permeated poritons in permeate zones 23 and 24 would destroy the separation obtained. This is true because if the permeated portions from permeate zones 23 and 24 were to be combined, the resultant mixture would have the composition of the azeotropic mixture at any given instant of combination. Since the compositions of the permeated portions in permeate zones 23, 23a, etc. are the same, these permeate zones may be connected by means of lines 28, 28a, etc., respectively. Line 29 connects lines 28 and 28a with vacuum pump 31 which maintains an absolute pressure in permeate zones 23 and 23a of about 30 mm. Hg abs. This low absolute pressure which is maintained in the permeate zones 23 and 23a causes the mixture which has permeated through the membrane and into the permeate zones to exist in the vapor state in the permeate zones. The permeated portion removed from permeate zones 23 and 23a is obtained at the rate of 5,270 lbs./hr. and has a composition of about 85 weight percent pyridine and about 15 weight percent water.

The portion which permeates the regenerated cellulose membranes 22, 22a, etc. are removed from permeate zones 24, 24a, etc. and passed by way of lines 32, 32a, etc. into line 33 which connects with vacuum pump 34. Vacuum pump 34 maintains an absolute pressure in permeate zones 24, 24a, etc. of about 30 mm. Hg abs. and thereby maintains the permeated portion in the vapor state in the permeate zones. The permeate is removed from permeate zones 24, 24a, etc. at the rate of about 7,030 lbs./hr. and has a composition comprising about 88 weight percent water and 12 weight percent pyridine. The permeate vapors are passed from vacuum pump 34 by way of line 36 into compressor 37 and thence passed by way of line 38 into cooler 39. The permeated portion is liquified by this sequence and then passed by way of line 41 into fractionator 42.

In fractionation tower 42 a split is made between a bottoms fraction consisting of essentially pure water and an overhead fraction which has a composition approaching the composition of the azeotropic mixture. While theoretically possible, in a practical operation a perfect split cannot be made between the azeotropic mixture and the excess component. To obtain the excess component in high purity it is desirable to carry out the splitting so that the overhead consists of the azeotropic mixture of water and pyridine plus excess water. Essentially pure water in the amount of about 4,780 lbs./hr. is removed from the system by way of line 43. An overhead stream is removed from fractionator 42 by way of line 44. This overhead stream is removed at the rate of about 2,250 lbs./hr. and has a composition of about 62.4 weight percent water and 37.6 weight percent pyridine.

Referring now to the portion which has permeated the irradiated polyethylene membrane 21, 21a, etc. and is removed from permeate zones 23, 23a, etc., the permeated portion is passed from vacuum pump 31 by way of line 46 into compressor 47. It is then passed by way of line 48 into cooler 49 and is liquified by this sequence of compression and cooling. The now-liquified permeated portion is passed by way of line 51 into fractionator 52. A split is made in fractionator 52 between a bottoms fraction consisting of essentially pure pyridine and an overhead fraction consisting of the azeotropic mixture of pyridine and water plus some excess pyridine. As was pointed out previously, a perfect split cannot be obtained in practical splitting operations. The bottoms stream of essentially pure pyridine is removed from fractionator 52 by way of line 53 at the rate of about 3,720 lbs./hr.

The overhead stream from fractionator 52 is removed at the rate of 1,550 lbs./hr. and has a composition of 49 weight percent pyridine and 51 weight percent water. the overhead stream is passed by way of line 54 and meets the overhead stream from fractionator 42 and is combined therewith and passed by way of line 56 into compressor 57. The splitting operations carried out in fractionators 42 and 52 are adjusted so that the composition obtained by combining the overhead fractions at any given instant approximates the azeotropic composition. Since the overheads from fractionators 42 and 52 are recycled to the feed zone, there is no compelling incentive for using extremely sharp fractionation equipment for fractionators 42 and 52 in order to obtain a very precise split between the excess component and the azeotropic mixture. The compressed overhead fractions are then passed from compressor 57 by way of line 58 into heater 59. The vapors removed from the top of fractionators 42 and 52 are liquified in this manner and brought to a temperature of 140° C. These combined fractions have a composition of 43 weight percent pyridine and 57 weight percent water (the azeotropic composition) and are thus recycled to the permeation apparatus by way of line 61 in the amount of 3,800 lbs./hr.

The manner of determing the amount of effective surface area of each of the dissimilar membranes which are employed in each permeation apparatus is easily carried out. For example the ratio of the effective surface area of regenerated cellulose to the effective surface area of irradiated polyethylene employed in the described embodiment was determined by introducing the charge mixture (43 weight percent pyridine and 57 weight percent water) into a conventional permeation apparatus consisting of a feed zone separated from a single permeate zone by the irradiated polyethylene membrane (Irrathene-201). The permeation apparatus consisted of a box-like feed chamber for the azeotropic mixture introduced therein; a smaller membrane holder of box-like shape having five open faces across which the membranes were sealed, the sixth face having sealed thereto a line for removing the permeated portion from the interior (permeate zone) of the membrane holder, the entire membrane holder being positioned within the feed chamber; and associated pumps, pressure regulating and measuring device, and temperature controllers for controlling the temperature and pressure in the feed and permeate zones at those conditions desired. A total of 22 sq. ins. of effective membrane surface was provided by the small permeation apparatus. The azeotropic mixture was subjected to permeation at the conditions to be employed in the large scale embodiment illustrated previously using the membranes to be employed therein, i.e. operating temperature of 140° C., 30 mm. Hg abs. pressure in the permeate zone, the mixture in the feed zone maintained in the liquid phase, the permeated portion maintained in the vapor phase. It was found that the 1 mil thickness Irrathene-201 membrane allowed the permeated portion to permeate through the membrane at the rate of about 1,700 lbs./hr./1,000 sq. ft. of effective membrane surface/mil thickness of membrane, and the permeated portion consisted of 85 weight percent pyridine and 15 weight percent water. When a fresh charge of pyridine-water azeotropic mixture was introduced into the feed chamber of the small scale apparatus in which the regenerated cellulose 300 PT (cellophane) membrane was substituted for the Irrathene-201 membrane, the rate of permeation of the permeated portion through the membrane was 3,700 lbs./hr./1,000 sq. ft. of effective membrane surface/mil thickness of membrane. The composition of this permeated portion was 88 weight percent water and 12 weight percent pyridine.

Because the composition in the feed zone remains constant throughout the permeation run, the following formula can be set up:

(1)

$$\frac{\text{Amt. } B \text{ thru membrane } Y + \text{amt. } B \text{ thru membrane } Z}{\text{Amt. } A \text{ thru membrane } Z + \text{amt. } A \text{ thru membrane } Y}$$
$$= \frac{\text{wt. percent } B \text{ in charge}}{\text{wt. percent } A \text{ in charge}}$$

wherein:
$A$ = pyridine
$B$ = water
$Y$ = regenerated cellulose 300 PT membrane
$Z$ = Irrathene-201 membrane Since:

(2) The amount $B$ through membrane $Y$ = (the permeation rate through membrane $Y$) × (the weight percent $B$ in the portion which permeated through membrane $Y$) × (the effective area of membrane $Y$)

and since the amount of $A$, and the amounts $A$ and $B$ through the other membranes can be determined in the same fashion, substitution and rearrangement of Formula 1 yields the following formula for the ratio of membrane areas to employ:

(3)

$$\frac{\text{Area } Z}{\text{Area } Y} = \frac{\text{rate thru } Y \ (100 - \text{wt. percent } B \text{ in charge} - \text{wt. percent } A \text{ in permeate thru } Y)}{\text{rate thru } Z \ (100 - \text{wt. percent } A \text{ in charge} - \text{wt. percent } B \text{ in permeate thru } Z)}$$

Substituting the permeation rates and the composition of the azeotropic mixture and the permeated portions into Formula 3 provides the following:

$$\frac{\text{Area } Z}{\text{Area } Y} = \frac{3700(100 - 57 - 12)}{1700(100 - 43 - 15)} = 1.606$$

Thus 1.606 sq. ft. of effective surface area of the Irrathene-201 membrane of 1 mil in thickness should be employed per each effective square foot of regenerated cellulose 300 PT membrane of 1 mil thickness which is used in each feed zone. Minor modification of formula 1 can be used to calculate the ratios of the dissimilar membranes when three or more dissimilar membranes are to be employed in this invention. If the operation of the large scale unit is to be changed with respect to operating temperature, pressure, choice of permeation membrane or thickness thereof, the ratio of membrane surfaces should be redetermined in accordance with the described procedure. If the thickness of both membranes is changed by the same percentage, the previous ratios of membrane surface will generally still hold true.

While the invention has been described by its use in the separation of an azeotropic mixture of pyridine and water, it obviously may be used for the separation of other binary azeotropic mixtures of water with organic compounds such as carbon tetrachloride, methyl nitrate, methanol, bromoethane, methyl sulfate, propionic acid, benzene, phenol, etc. Binary azeotropic mixtures of different organic compounds such as the azeotropic mixtures of carbon tetrachloride-methanol, carbon disulfide-formic acid, chloroform-acetone, methyl nitrate-cyclohexane, ethyl alcohol-octane, benzene-cyclohexane may also be separated by this invention. Ternary azeotropic mixtures, for example water-tertiarybutyl alcohol-benzene, water-amyl alcohol-amyl acetate, etc. similarly may be resolved to recover the individual components. Lists of azeotropic mixtures, their composition, etc. which may be separated are provided in "Azeotropic Data," by L. H. Horsley, Advances in Chemistry Series No. 6 (1952). While a wide variety of mixtures of different molecules may be separated by the invention, the process of the invention is applicable only to the separation of mixtures of molecules which exist as molecular solutions rather than as suspensions or colloidal solutions. Colloidal solutions such as aqueous sugar solutions, aqueous inorganic salt solutions, solutions of chlorophyl in a solvent, etc. are separated by a process entirely distinct from the process of this invention, i.e. they are frequently separated by dialysis in which a macromolecule such as sugar is incapable of passing through a dialysis membrane in any amount whatsoever.

In separating ternary azeotropic and non-azeotropic mixtures, three dissimilar permeation membranes, each of which permeate a different component of the mixture selectively, i.e. permeate all of the components but permit one to permeate more rapidly than the others, may be used to separate the feed zone from three separate non-communicating permeate zones. If three dissimilar membranes are used, then three separate fractionation systems should be used on the three separate permeate portions, rather than the two fractionators employed in the illustrated embodiment. A four component mixture may be separated in an analogous manner. Three and four component mixtures may also be separated using two dissimilar membranes which are properly adjusted for surface area so as to maintain the composition in the feed zone approximately constant.

While the invention is especially useful in the separation of azeotropic mixtures, it is also very useful in separating mixtures of organic chemicals which vary slightly or greatly from the azeotropic composition or which do not form azeotropic compositions at all. The advantages of the invention accrue also when such non-azeotropic mixtures are separated. When separating mixtures which do not form azeotropic compositions, the present invention may be practised without the use of ancillary fractionating equipment for splitting the permeated portions. Instead, the separate permeated portions may be passed to subsequent permeation stages in which additional separation by permeation is effected as a substitute for a fractionation type of separation described in the illustrated embodiment. By provision of the necessary additional permeation stages with recycling of various permeated and/or non-permeated portions to different permeation stages, it is possible to separate mixtures of various organic compounds, mixtures of water with various organic compounds, etc into their individual components in essentially pure form.

Any of a variety of permeation membranes may be employed, provided they preferentially permeate a given component of the charge mixture to be separated. Plastic non-porous membranes comprised of regenerated cellulose, cellulose nitrate, cellulose acetate, polyvinyl ether, polyacrylonitrile, etc. are highly effective for permeating water in preference to organic compounds such as hydrocarbons, oxygen containing organic compounds such as methanol, acetone, chlorine containing organic compounds, and other organic molecules. Polyethylene, irradiated polyethylene, polystyrene, vinylidene chloride-acrylonitrile copolymers, neoprene, butadiene-styrene-copolymers and similar membrane materials permeate hydrocarbons and molecules which are highly hydrophobic in preference to permeating water, methanol, ethanol and similar hydrophilic molecules. Certain cellulose esters and ethers such as cellulose acetate-butyrate, cellulose propionate, cellulose acetate-propionate, ethyl cellulose, propyl cellulose, etc. are effective for permeating hydrocarbons containing an oxygen, chlorine or similar substituent in preference to permeating hydrocarbons; and membranes comprised of these materials are also useful in separating hydrocarbon molecules from each other based upon type and/or skeletal configuration (e.g. separating benzene from cyclohexane, benzene from heptane, n-octane from isoctane).

While the permeation step in the desired embodiment was carried out by maintaining the mixture in the feed zone in the liquid state and withdrawing the permeated portion in the vapor state, the mixtures in the feed zone and the permeate zone may both be maintained in the vapor state or in the liquid state. It is, of course, essential that the permeated portion be removed from the permeate zone without allowing it to collect therein for any substantial time since collection therein would reduce the driving force which causes permeation to occur. Wide variations in the permeation operating temperatures and pressures may be used. Thus, temperatures of from 0 to 200° C. may be employed, depending upon the physical state of the mixtures which are desired in the feed and permeate zones, and the stability of the permeation membranes when subjected to such temperatures. Similarly, the pressure may be varied over a wide range of conditions dependent primarily upon the physical state of the mixture desired in the feed and permeate zones. If it is desired to maintain the mixture in the feed zone in the vapor state and the mixture in the permeate zones in the vapor state, then it is necessary to employ a higher pressure in the feed zone than in the permeate zones in order to provide the driving force causing permeation. Other variations in operating conditions, etc. will be apparent to those skilled in this art.

What I claim is:

1. A process for the separation of molecular solutions of a mixture of components A and B which comprises introducing said mixture into the feed zone of a permeation apparatus, which permeation apparatus is comprised of an enclosed vessel containing a feed zone and two non-communicating permeate zones $A_1$ and $B_1$, two dissimilar permeation membranes $A_2$ and $B_2$ of different composition positioned within said enclosed vessel which membranes serve as boundaries for the feed zone and separate the feed zone from the two non-communicating permeate zones, permeation membrane $A_2$ separating the feed zone from permeate zone $A_1$ and permeation membrane $B_2$ separating the feed zone from permeate zone $B_1$, permeation membrane $A_2$ being selective for the preferential permeation of component A and permeation membrane $B_2$ being selective for the preferential permeation of component B; permeating the mixture in the feed zone through said permeation membranes $A_2$ and $B_2$ and into the separate permeate zones $A_1$ and $B_1$; separately withdrawing the permeated portions from the permeate zones $A_1$ and $B_1$, and maintaining the compositions of the permeated portions and the composition of the mixture in the feed zone approximately constant by employing amounts of effective surface areas of the dissimilar permeation membranes $A_2$ and $B_2$ in ratios relative to each other such that if the permeating portions were to be combined at any given instant the composition of the combined mixture which would be obtained would correspond approximately to the composition of the feed mixture.

2. A process for the separation of molecular solutions of a mixture of components which comprises introducing said mixture into the feed zone of a permeation apparatus, which permeation apparatus is comprised of an enclosed vessel containing a feed zone and at least two separate non-communicating permeate zones, at least two dissimilar permeation membranes of different composition positioned within said enclosed vessel which membranes serve as boundaries for the feed zone and separate the feed zone from the non-communicating permeate zones, the minimum number of non-communicating permeate zones being the same as the minimum number of permeation membranes which are dissimilar, each permeation membrane which is dissimilar being preferentially selective for the permeation of a different component of said mixture; permeating the mixture in the feed zone through said dissimilar permeation membranes and into the non-communicating permeate zones; separately withdrawing the permeated portions from their respective permeate zones; and maintaining the compositions of the permeated portions and the composition of the mixture in the feed zone approximately constant by employing amounts of effective surface areas of the dissimilar permeation membranes in ratios relative to each other such that if the permeating portions were to be combined at any given instant the composition of the combined mixture which would be obtained would correspond approximately to the composition of the feed mixture.

3. A process for the recovery of the individual components of an azeotropic mixture consisting of components A and B which comprises introducing said azeotropic mixture into the feed zone of a permeation apparatus, which permeation apparatus is comprised of an enclosed vessel containing a feed zone and two non-communicating permeate zones $A_1$ and $B_1$, two dissimilar permeation membranes $A_2$ and $B_2$ of different composition positioned within said enclosed vessel which membranes serve as boundaries for the feed zone and separate the feed zone from the two separate non-communicating permeate zones, permeation membrane $A_2$ separating the feed zone from permeate zone $A_1$ and permeation membrane $B_2$ separating the feed zone from permeate zone $B_1$, permeation membrane $A_2$ being selective for the preferential permeation of component A and permeation membrane $B_2$ being selective for the preferential permeation of component B; permeating the azeotropic mixture in the feed zone through said permeation membranes $A_2$ and $B_2$ and into the separate permeate zones $A_1$ and $B_1$; withdrawing the permeated portion from permeate zone $A_1$ and passing it to fractionator $A_3$ wherein it is fractionated into one fraction consisting of component A in essentially pure form which is withdrawn from the process and another fraction consisting of a mixture of components A and B; withdrawing the permeated portion from permeate zone $B_1$ and passing it to fractionator $B_3$ wherein it is fractionated into two fractions one of said fractions consisting of component B in essentially pure form which is withdrawn from the process and the other fraction consisting of a mixture of components A and B; returning the fractions from fractionators $A_3$ and $B_3$ which consist of a mixture of components A and B into the feed zone of the permeation apparatus; and maintaining the composition in the feed zone substantially constant at approximately the composition of the azeotropic mixture by employing amounts of effective surface areas of the dissimilar permeation membranes $A_2$ and $B_2$ in the ratios relative to each other such that if the permeating portions from permeate zones $A_1$ and $B_1$ were to be combined at any given instant the composition of the combined mixture which would be obtained would correspond approximately to the composition of the azeotropic mixture.

4. The process of claim 3 in which the azeotropic mixture is an azeotropic mixture of pyridine and water.

5. A process for the recovery of the individual components of an azeotropic mixture which comprises introducing an azeotropic mixture into the feed zone of a permeation apparatus, which permeation apparatus is comprised of an enclosed vessel containing a feed zone and at least two separate non-communicating permeate zones, at least two dissimilar permeation membranes of different composition positioned within said enclosed vessel which membranes serve as boundaries for the feed zone and separate the feed zone from the non-communicating permeate zones, the minimum number of non-communicating permeate zones being the same as the minimum number of permeation membranes which are dissimilar and also being the same as the number of components contained in the azeotropic mixture being separated, each permeation membrane which is dissimilar being preferentially selective for the permeation of a different component of said azeotropic mixture; permeating the azeotropic mixture in the feed zone through said dissimilar permeation membranes and into the non-communicating permeate zones associated with the respective dissimilar permeation membranes; withdrawing the permeated portions from the non-communicating permeate zones and separately passing these permeated portions into separate fractionation units; fractionating the permeated portions in each of said fractionation units to obtain two fractions; one of said fractions consisting of a component of said azeotropic mixture in essentially pure form which is recovered and withdrawn from the process, and the other fraction consisting of a mixture of the components contained in said azeotropic mixture; and returning the fractions consisting of the mixtures of components contained in the azeotropic mixture into the feed zone of the permeation apparatus; the dissimilar permeation membranes having effective surface areas in ratios relative to each other such that if the permeating portions were to be combined at any given instant the composition of the combined mixture which would be obtained would correspond approximately to the composition of the azeotropic mixture.

References Cited in the file of this patent
UNITED STATES PATENTS

| 2,159,434 | Frey | May 23, 1939 |
| 2,386,826 | Wallach et al. | Oct. 16, 1945 |
| 2,583,601 | Schwertz | Jan. 29, 1952 |

FOREIGN PATENTS

| 663,720 | Great Britain | Dec. 27, 1951 |

OTHER REFERENCES

"Technique of Organic Chemistry," vol. III, Part I, "Separation and Purification," ed. by Arnold Weissberger, 2nd ed., published by Interscience Pub., Inc., N.Y., 1956, page 812.

UNITED STATES PATENT OFFICE
CERTIFICATE OF CORRECTION

Patent No. 2,981,680                                April 25, 1961

Robert C. Binning

It is hereby certified that error appears in the above numbered patent requiring correction and that the said Letters Patent should read as corrected below.

Column 7, line 47, for "isoctane" read -- isooctane --; line 48, for "desired" read -- described --.

Signed and sealed this 19th day of September 1961.

(SEAL)
Attest:

ERNEST W. SWIDER
Attesting Officer

DAVID L. LADD
Commissioner of Patents
USCOMM-DC